United States Patent
Sharif

(10) Patent No.: US 7,942,205 B2
(45) Date of Patent: May 17, 2011

(54) SECONDARY OIL RECOVERY

(75) Inventor: Adel Sharif, Guildford (GB)

(73) Assignee: Surrey Aquatechnology Limited, Guildford, Surrey (GB)

(*) Notice: Subject to any disclaimer, the term of this patent is extended or adjusted under 35 U.S.C. 154(b) by 402 days.

(21) Appl. No.: 11/919,699

(22) PCT Filed: May 5, 2006

(86) PCT No.: PCT/GB2006/001647
§ 371 (c)(1),
(2), (4) Date: Jan. 30, 2008

(87) PCT Pub. No.: WO2006/120399
PCT Pub. Date: Nov. 16, 2006

(65) Prior Publication Data
US 2009/0020289 A1    Jan. 22, 2009

(30) Foreign Application Priority Data
May 6, 2005 (GB) .................... 0509306.7

(51) Int. Cl.
*E21B 43/16* (2006.01)
*E21B 43/40* (2006.01)

(52) U.S. Cl. ............. 166/371; 166/75.12; 166/90.1; 166/267

(58) Field of Classification Search ................ None
See application file for complete search history.

(56) References Cited

U.S. PATENT DOCUMENTS

| | | | |
|---|---|---|---|
| 4,723,603 A | 2/1988 | Plummer | |
| 4,844,158 A * | 7/1989 | Jennings, Jr. | 166/267 |
| 5,331,155 A * | 7/1994 | Blauch | 250/255 |
| 6,164,378 A | 12/2000 | Coronado | |
| 6,164,379 A | 12/2000 | de Oliveira | |
| 2001/0005710 A1 | 6/2001 | Hegre et al. | |
| 2005/0022989 A1 * | 2/2005 | Heins | 166/272.3 |
| 2005/0023222 A1 | 2/2005 | Baillie | |
| 2006/0237366 A1 | 10/2006 | Al-Mayahi | |
| 2008/0169098 A1 * | 7/2008 | Christopher et al. | 166/275 |

FOREIGN PATENT DOCUMENTS

| | | |
|---|---|---|
| GB | 1520877 | 8/1978 |
| WO | 0212675 | 2/2002 |

* cited by examiner

*Primary Examiner* — Zakiya W. Bates
(74) *Attorney, Agent, or Firm* — Whyte Hirschboeck Dudek S.C.

(57) ABSTRACT

A process for injecting water into a subterranean petroleum-bearing formation for petroleum recovery, said method comprising: a) positioning a selective membrane (14) between an aqueous solution (18) and formation water (20) having a higher solute concentration than the aqueous solution (18), such that water passes across the membrane (14) by osmosis to dilute the formation water (20), b) injecting the diluted formation water (22) into the petroleum-bearing formation, c) recovering formation water from the petroleum-bearing formation, and d) using at least a portion of the recovered formation water in step a).

12 Claims, 1 Drawing Sheet

SECONDARY OIL RECOVERY

Figure 1:
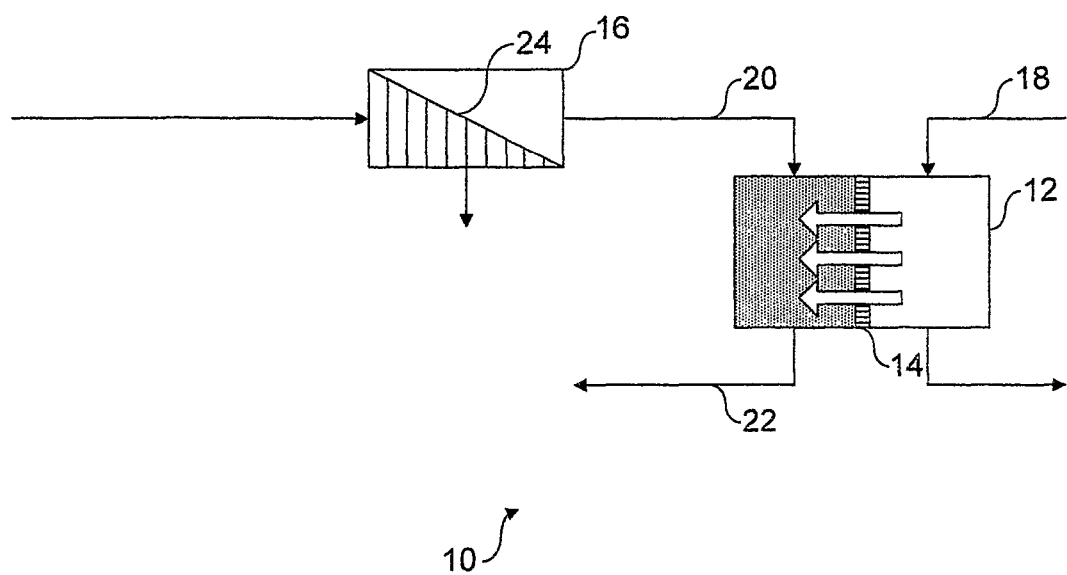

The present invention relates to an apparatus and process for injecting water into a subterranean petroleum-bearing formation for petroleum recovery.

In the initial stages of petroleum/oil production, the pressure within the subterranean formation drives the petroleum to the production well. However, over time, the formation pressure dissipates and natural extraction of petroleum can no longer be sustained.

To extract the remaining petroleum from the formation secondary recovery techniques are employed. One of the most common secondary recovery techniques is water flooding. In this approach, an additional injection well is drilled into the subterranean formation into which water is injected. The injected water displaces the petroleum in the formation, directing it to the surface. Water flooding requires large volumes of injection water and, typically, up to ten barrels of injection water are required for each barrel of petroleum produced.

Where water flooding is used to displace petroleum from the formation, it is important to ensure that the injection water is substantially free from suspended particles, as these would otherwise accumulate and restrict the pores in the subterranean formation. Various methods have been developed to remove such suspended particles from the injection water. In US 2005/0023222, for example, an ultra-filtration or microfiltration membrane is used to filter the injection water before it is introduced into the formation. In WO 2005/012185, injection water is purified using a process comprising a direct osmosis step.

Ionic species in the injection water may also react with ionic species in the formation water to form precipitates or scale. For example, sulfate anions in the injection water may react with barium cations in the formation water to form an insoluble barium sulfate precipitate. Such precipitates tend to accumulate and block pores in the formation, impeding petroleum recovery. Scale inhibitors may be added to the injection water to reduce the formation of such precipitates. However, it is among the objects of embodiments of the present invention to reduce the risk of scale formation further.

According to the present invention, there is provided a process for injecting water into a subterranean petroleum-bearing formation for petroleum recovery, said method comprising:

a) positioning a selective membrane between an aqueous solution and formation water having a higher solute concentration than the aqueous solution, such that water passes across the membrane by osmosis to dilute the formation water, b) injecting the diluted formation water into the petroleum-bearing formation, c) recovering formation water from the petroleum-bearing formation, and d) using at least a portion of the recovered formation water in step a).

In the process of the present invention, a selective membrane is positioned between an aqueous solution and formation water having a higher solute concentration than the solution. The difference in solute concentration (or osmotic potential) between the aqueous solution and the formation water causes liquid water to flow across the selective membrane by osmosis. Suspended particles and/or dissolved solutes in the aqueous solution may be prevented from flowing across the membrane by selecting the pore size of the membrane accordingly.

The diluted formation water is then injected into the petroleum-bearing formation, preferably at elevated pressure. Once injected into the formation, the injected water typically comes into contact with formation water in the formation. As the injected water is formed at least in part from formation water, it is generally compatible with the formation water in the formation. Thus, scale formation may advantageously be reduced or eliminated.

The injected formation water may be used to displace petroleum from the formation and direct it to the surface. Typically, the displaced petroleum emerges from the formation in admixture with formation water.

The formation water may be recovered by conventional separation techniques. The recovered formation water typically comprises a relatively high solute concentration, as it contains dissolved salts from the formation. The recovered formation water may be used directly to draw water from the aqueous solution by osmosis (step a). Alternatively, the recovered formation water may first be pretreated to increase its concentration (osmotic potential) before it is used in the osmosis step (a). For example, water may be removed from the recovered formation water by conventional techniques such as evaporation. Alternatively or additionally, other solutes (e.g. salts) may be added to the recovered formation water. As a further alternative, formation water may be passed through a filtration membrane, such as a microfiltration, ultrafiltration and/or nanofiltration membrane. The residual solution may be recovered and used to draw water from the aqueous solution by osmosis (step a).

Any suitable aqueous solution may be used as a source of water in step (a). Suitable aqueous solutions include seawater, fresh water, such as lake, ground or river water, and water from waste streams of an industrial or agricultural process. Commonly, the aqueous solution is seawater.

Any suitable selective membrane may be used in the process of the present invention. The membrane may have an average pore size of 1 to 80 Angstroms, preferably, 5 to 70, for example 10 to 60 Angstroms. The membrane may have an average pore size of up to 50 Angstroms, for example, up to 40 Angstroms. In one embodiment, the membrane has a pore size of up to 30 Angstroms. The pore size of the membrane is preferably selected to be suitable for removing ions from the aqueous solution, which lead to fouling. Examples of such ions include sulfate ions. In certain instances, it may also be desirable to selectively remove monovalent ions, such as sodium cations.

Suitable selective membranes include integral membranes and composite membranes. Examples of suitable membranes include membranes formed of cellulose acetate (CA) and membranes formed of polyamide (PA). Suitable cellulose acetate membranes include cellulose triacetate (CTA) membranes, suh as those used in the study of McCutcheon et al., Desalination 174 (2005) 1-11. Conventional semi-permeable membranes may be employed. Preferably, the membrane is an ion-selective membrane.

The membrane may be planar or take the form of a tube or hollow fibre. If desired, the membrane may be supported on a supporting structure, such as a mesh support.

In one embodiment, one or more tubular membranes may be disposed within a housing or shell. The aqueous solution may be introduced into the housing, whilst the formation water may be introduced into the tubes (or vice-versa). As the solute concentration of the aqueous solution is lower than that of the formation water, water will diffuse across the membrane from the aqueous solution into the formation water. Thus, the formation water will become increasingly diluted and the aqueous solution, increasingly concentrated. The diluted formation water may be recovered from the interior of the tubes (or housing, as the case may be), whilst the concentrated aqueous solution may be removed from the housing (or tubes, as the case may be).

The flow of water across the selective membrane may be influenced by thermal conditions. Thus, the solutions on either side of the membrane may be heated or cooled, if desired. The solutions may be heated to temperatures of 30 to 80° C., for example, 40 to 60° C. Alternatively, the solutions may be cooled to −20 to 20° C., for example, 7 to 12° C. The solution on one side of the membrane may be heated, while the other side cooled. The heating or cooling may be carried out on each solution independently. Chemical reactions may also be carried out on either side of the membrane, if desired.

In a preferred embodiment of the invention, the aqueous solution is at a lower temperature than the formation water on the other side of the membrane. This difference in temperature increases the osmotic potential difference across the membrane and hence the water flux. The osmotic potential difference may also be enhanced by treating the formation water to increase its osmotic potential. Suitable treatment steps include adjusting the pH of the formation water, adding more salts/solutes to the formation water, heating the formation water, and/or inducing chemical reactions or electric charges in the formation water. Similarly, it may be desirable to decrease the osmotic potential of the aqueous solution. Suitable treatment steps include cooling the solution, removing salts/solutes from the solution, adjusting the pH of the solution and/or inducing chemical reactions or electric charges in the formation water.

To improve the efficacy of the osmosis step, the aqueous solution and/or formation water may also be treated to reduce fouling and scaling of the membrane. Accordingly, anti-scaling and/or anti-fouling agents may be added to one or both solutions. Although not required, pressure may be applied to the aqueous solution side of the membrane to increase the rate of flux of water across the membrane. For example, pressures of 1 to 5 bar may be applied. Additionally or alternatively, the pressure on the formation water side of the membrane may be reduced.

The viscosities of the aqueous solution and/or the formation water may also be modified to improve the rate of flux across the membrane. For example, viscosity modifying agents may be employed.

The process of the present invention may further comprise a pre-treatment step of removing contaminants, such as suspended particles and biological matter, from the aqueous solution (e.g. seawater). In one embodiment, such contaminants are removed by conventional methods, such as filtration. Suitable filtration methods include microfiltration, ultrafiltration and nanofiltration. Such filtration steps advantageously reduces the risk of fouling of the membrane in the direct osmosis step (a). Additionally or alternatively, pH adjusting agent(s), emulsifier(s), surfactant(s), anti-corrosion agent(s), anti-microbial agent(s) and anti-scaling agent(s) may be added to the aqueous solution. Where seawater is used as the aqueous solution, deep seawater is preferably employed as it generally contains fewer suspended particles and less biological matter than seawater obtained from the surface of the ocean. In some applications, submerged osmosis units may be used.

As mentioned above, the difference in solute concentration (or osmotic potential) between the aqueous solution and the formation water causes liquid water to flow across the selective membrane by osmosis. The diluted formation water is injected into the petroleum-bearing formation to displace petroleum from the formation. Prior to injection into the formation, the formation water may be pre-treated, for example, to remove contaminants, such as suspended particles and biological matter. In one embodiment, such contaminants are removed by conventional methods, such as filtration. Suitable filtration methods include microfiltration, ultrafiltration and nanofiltration. Additionally or alternatively, anti-microbial agent(s), anti-corrosion agent(s), surfactant(s), pH adjuster(s) (e.g. to maintain the pH below 4.8 or above 10.5), emulsifier(s), surfactant(s) and anti-scaling agent(s) may be added to the formation water. Examples of suitable additives include acids, such as carboxylic acids; alkalis, such as hydroxides; polymers, such as xanthan gum, polyacrylamide and dextrin; protein, lipoprotein, lipid and glyco-lipid surfactants; and anti-scaling agents, such as penta-phosphonate. These additives may be re-used in the process of the present invention as at least part of the formation water employed in the process may be recycled in a closed loop.

Prior to injection into the formation, the formation water may also be pre-treated by deaeration to remove air and other gases from the formation water. This reduces or prevents the risk of aerobic bacterial activity during the injection process.

The formation water may be injected into the petroleum-bearing formation at elevated pressure to drive petroleum from the formation to the surface. Pressures of 100 to 4200 psi, preferably 200 to 4000 psi, more preferably 300 to 3500 psi may be employed. The flow of water across the selective membrane in the osmosis step (a) may be used to pressurise solution, although additional pressurising means may also be required.

Typically, petroleum is forced to the surface in admixture with formation water. The formation water may be recovered from the petroleum by conventional separation techniques. In one embodiment, the mixture of petroleum and formation water is allowed to settle in a separation vessel. After a period of time, the denser formation water separates from the petroleum as a lower layer. Demulsifying agents may be added to the petroleum/formation water mixtures to aid the separation step.

The recovered formation water typically comprises a relatively high solute concentration, owing to the presence of dissolved salts from the formation. The recovered formation water may be used directly to draw water from the aqueous solution by osmosis (step a). Alternatively, the formation water may first be pretreated to increase its concentration before it is used in the osmosis step (a). For example, water may be removed from the recovered formation water by conventional techniques such as evaporation.

Alternatively or additionally, the formation water may be passed through a filtration membrane, such as a nanofiltration membrane. The residual solution may be recovered and used to draw water from the aqueous solution by osmosis (step a).

Alternatively or additionally, solutes may be added to the formation water prior to the osmosis step (a).

Any suitable solute may be added to the formation water. Preferably, the solute(s) are selected so as to produce an injection composition that is compatible with the formation water in the formation. Suitable solutes include halides (e.g. fluorides, chlorides, bromides) aldehydes (e.g. formaldehydes), acetates, and hydroxides (e.g. sodium hydroxide and calcium hydroxide). Preferred solutes are salts, such as calcium chloride and barium chloride. Solute species that are likely to form precipitates with solute(s) in the formation water in the formation, such as sulfates, are preferably avoided. In fact, as will be described below, such solutes may be removed, for example, by filtration (e.g. nanofiltration).

The solutes may be added in pure form, for example, as a solid or liquid, or as a solution, such as an a concentrated solution.

Before the recovered formation water is used to draw water from the aqueous solution by osmosis (step a), the recovered formation water may also be subjected to other pretreatment steps. In one embodiment, for example, the recovered formation water is pre-treated to remove contaminants, such as suspended particles and biological matter. Undesirable ions, which would otherwise lead to scaling, may also be removed. Such contaminants may be removed by conventional methods, such as filtration. Suitable filtration methods include microfiltration, ultrafiltration and nanofiltration. Nanofiltration may be particularly suitable for removing ions, such as sulfates, which would otherwise lead to scaling. Additionally or alternatively, anti-microbial agent(s), pH adjuster(s), emulsifier(s) and anti-scaling agent(s) may be added to the aqueous solution. Examples of suitable additives include acids, such as carboxylic acids; alkalis, such as hydroxides; polymers, such as xanthan gum, polyacrylamide and dextrin; protein, lipoprotein, lipid and glyco-lipid surfactants; and anti-scaling agents, such as penta-phosphonate.

Where a microfiltration membrane is employed in the present invention, any suitable microfiltration membrane may be used. Typically, such membranes have pores that are 1000 to 100,000 Angstroms, preferably 5000 to 70,000 Angstroms in size. Such membranes may be capable of removing certain bacteria from the medium under treatment.

Where an ultrafiltration membrane is employed in the present invention, any suitable ultrafiltration membrane may be used. Typically, such membranes have pores that are 20 to 1000 Angstroms, preferably 50 to 800 Angstroms in size. Such membranes may be capable of removing certain bacteria from the medium under treatment, as well as certain macromolecules.

Where nanofiltration membranes are employed in the process of the present invention, any suitable nanofiltration membrane may be used. Typically, such membranes have pores that are 5 to 20 Angstroms, preferably 10 to 15 Angstroms in size.

Suitable nanofiltration membranes include crosslinked polyamide membranes, such as crosslinked aromatic polyamide membranes. The membranes may be cast as a "skin layer" on top of a support formed, for example, of a microporous polymer sheet. The resulting membrane has a composite structure (e.g. a thin-film composite structure). Typically, the separation properties of the membrane are controlled by the pore size and electrical charge of the "skin layer". The membranes may be suitable for the separation of components that are 0.01 to 0.001 microns in size and molecular weights of 100 gmol$^{-1}$ or above, for example, 200 gmol$^{-1}$ and above.

As well as filtering particles according to size, nanofiltration membranes can also filter particles according to their electrostatic properties. For example, in certain embodiments, the surface charge of the nanofiltration membrane may be controlled to provide desired filtration properties. For example, the inside of at least some of the pores of the nanofiltration membrane may be negatively charged, restricting or preventing the passage of anionic species, particularly multivalent anions, such as sulfates. The surface of the nanofiltration membrane may be similarly charged.

Examples of suitable nanofiltration membranes include Desal-5 (Desalination Systems, Escondido, Calif.), NF 70, NF 50, NF 40 and NF 40 HF membranes (FilmTech Corp., Minneapolis, Minn.), SU 600 membrane (Toray, Japan) and NRT 7450 and NTR 7250 membranes (Nitto Electric, Japan).

The nanofiltration membranes may be packed as membrane modules. Spiral wound membranes, and tubular membranes, for example, enclosed in a shell may be employed. Alternatively, the membranes may be provided as a plate or in a frame.

In one embodiment of the present invention, the process comprises dissolving at least one solute in water to provide a drive solution having a higher solute concentration than the liquid, positioning a selective membrane between the aqueous solution and the drive solution, such that water passes across the membrane by osmosis to dilute the drive solution, injecting the diluted drive solution into the petroleum-bearing formation, causing the solution to mix with formation water in the formation, recovering formation water from the petroleum-bearing formation, and using the recovered formation water in step a) of the process.

Any suitable solute may be added to provide the drive solution. Preferably, the solute(s) are selected so as to produce an injection composition that is compatible with the formation water in the formation. Suitable solutes include halides (e.g. fluorides, chlorides, bromides), aldehydes (e.g. formaldehydes), acetates and hydroxides (e.g. sodium hydroxide and calcium hydroxide). Preferred solutes are salts, such as calcium chloride and barium chloride. Solute species that are likely to form precipitates with solute(s) in the formation water in the formation, such as sulfates, are preferably avoided. The solutes may be added in pure form, for example, as a solid or liquid, or as a solution, such as an a concentrated solution.

Additionally or alternatively, anti-microbial agent(s), anti-corrosion agent(s), pH adjuster(s) (e.g. to maintain the pH below 4.8 or above 10.5), emulsifier(s), surfactant(s) and anti-scaling agent(s) may be used to form the drive solution. Examples of suitable additives include acids, such as carboxylic acids; alkalis, such as hydroxides; polymers, such as xanthan gum, polyacrylamide and dextrin; protein, lipoprotein, lipid and glyco-lipid surfactants; and anti-scaling agents, such as penta-phosphonate. These additives may be re-used in the process of the present invention they will be recycled in a closed loop.

In an another embodiment of the invention, the formation water may be mixed with a further aqueous solution prior to or after the osmosis step. The further aqueous solution may be a waste stream. Examples of waste streams include concentrated brine solutions from desalination plants, such as thermal desalination and/or reverse osmosis plants; and blow-down solutions from power plants. This mixing step, therefore, may provide a way of using waste solutions that would otherwise have to be disposed.

Preferably, impurities, such as suspended particles and biological impurities, are removed from this further solution before the solution is introduced into the petroleum-bearing formation. More preferably, these impurities are removed before the further solution is mixed with the formation water. Before the further solution is mixed with the formation, it may also be desirable to ensure that the further solution is compatible with the formation water. For example, ions, such as sulphate ions, that are likely to form insoluble precipitates with ions in the formation water may be removed, for example, by nanofiltration.

According to a further aspect of the present invention, there is provided an apparatus for injecting water into a subterranean petroleum-bearing formation for petroleum recovery, said apparatus comprising:

a housing comprising a selective membrane for separating an aqueous solution from formation water having a higher solute concentration than the aqueous solution and configured to allow water from the aqueous solution to pass across the membrane by osmosis to dilute the formation water, means for injecting the diluted formation water into the petroleum-bearing formation, means for recovering formation water from the petroleum-bearing formation, and means for introducing the recovered formation water into the housing.

These and other aspects of the present invention will now be described with reference to FIG. 1, which depicts a schematic diagram of an apparatus for carrying out a process according to an embodiment of the present invention.

FIG. 1 depicts an apparatus for injecting water into a subterranean petroleum-bearing formation (not shown). The apparatus 10 comprises a housing 12 comprising a selective membrane 14. The apparatus also comprises a nanofiltration unit 16.

In use, seawater is introduced into the housing 12 on one side of the selective membrane 14 via line 18. Formation water is introduced into the housing 12 on the opposite side of the selective membrane 14 via line 20. the formation water has a higher solute concentration than the seawater. Accordingly, water flows from the seawater side of the membrane 14 to the formation water side of the membrane 14 by osmosis. Diluted formation water is withdrawn from the housing 12 via line 22, whilst concentrated seawater is withdrawn from the housing 12 via line 24 and is returned to the sea.

The diluted formation water is used as injection water to displace petroleum from a petroleum-bearing formation and direct it to the surface. Typically, the displaced petroleum emerges from the formation in admixture with formation water.

The admixture is recovered and allowed to settle in a separation tank. After a period of time, the denser formation water separates from the petroleum as a lower layer.

The formation water is recovered and introduced into the filtration unit 16. In this unit 16, the formation water is passed through a membrane 24 (e.g. a microfiltration, ultrafiltration and/or nanofiltration membrane), which separates undesirable impurities from the remainder of the solution. The treated solution has a high solute concentration that is higher than the solute concentration of seawater. The treated solution is recycled to the housing 12 via line 20.

The invention claimed is:

1. A process for injecting water into a subterranean petroleum-bearing formation for petroleum recovery, said method comprising:
   a) positioning a selective membrane between an aqueous solution and formation water having a higher solute concentration than the aqueous solution, such that water-passes across the membrane by osmosis to dilute the formation water,
   b) injecting the diluted formation water into the petroleum-bearing formation,
   c) recovering formation water from the petroleum-bearing formation, and
   d) using at least a portion of the recovered formation water in step a).

2. The process as claimed in claim 1, wherein the aqueous solution is seawater, fresh water or a waste stream from an agricultural or industrial process.

3. The process as claimed in claim 1, wherein the formation water is treated by filtration prior to injection into the petroleum-bearing formation.

4. The process as claimed in claim 1, which further comprises the step of removing water from at least a portion of the recovered formation water prior to recycling said portion of recovered formation water to step a).

5. The process as claimed in claim 1, which further comprises introducing at least one additive selected from antimicrobial agents, ant-corrosion agents, surfactants, emulsifiers, scale inhibitors and pH stabilisers to the petroleum-bearing formation.

6. The process as claimed in claim 5, wherein the at least one additive is added to the formation water before it is introduced into the petroleum-bearing formation.

7. The process as claimed in claim 1, wherein, prior to step a), at least one solute is added to the formation water to increase its solute concentration further relative to liquid.

8. The process as claimed in claim 7, wherein the solute is selected from barium chloride and/or calcium chloride.

9. The process as claimed in claim 1, which comprises:
   dissolving at least one solute in water to provide a drive solution having a higher solute concentration than the liquid,
   positioning a selective membrane between the aqueous solution and the drive solution, such that water passes across the membrane by osmosis to dilute the drive solution,
   injecting the diluted drive solution into the petroleum-bearing formation, causing the solution to mix with formation water in the formation,
   recovering formation water from the petroleum-bearing formation, and
   using the recovered formation water in step a) of the process.

10. The process as claimed in claim 9, wherein the solute is selected from barium chloride and/or calcium chloride.

11. The process as claimed in any claim 1, wherein a waste stream from an industrial process is mixed with the formation water before or after step a).

12. An apparatus for injecting water into a subterranean petroleum-bearing formation for petroleum recovery, said apparatus comprising:
   a housing comprising a selective membrane for separating an aqueous solution from formation water having a higher solute concentration than the aqueous solution and configured to allow water from the aqueous solution to pass across the membrane by osmosis to dilute the formation water,
   means for injecting the diluted formation water into the petroleum-bearing formation,
   means for recovering formation water from the petroleum-bearing formation, and
   means for introducing the recovered formation water into the housing.

* * * * *